US012561775B2

(12) United States Patent
Zachrisson

(10) Patent No.: US 12,561,775 B2
(45) Date of Patent: Feb. 24, 2026

(54) EYE TRACKING SYSTEM

(71) Applicant: TOBII AB, Danderyd (SE)

(72) Inventor: Joakim Zachrisson, Danderyd (SE)

(73) Assignee: Tobii AB, Danderyd (SE)

( * ) Notice: Subject to any disclaimer, the term of this patent is extended or adjusted under 35 U.S.C. 154(b) by 495 days.

(21) Appl. No.: 17/809,752

(22) Filed: Jun. 29, 2022

(65) Prior Publication Data

US 2023/0005124 A1 Jan. 5, 2023

(30) Foreign Application Priority Data

Jun. 30, 2021 (SE) .................................. 2150853-6

(51) Int. Cl.
*G06V 40/18* (2022.01)
*G06T 7/00* (2017.01)
*G06T 7/20* (2017.01)

(52) U.S. Cl.
CPC .............. *G06T 7/0002* (2013.01); *G06T 7/20* (2013.01); *G06V 40/18* (2022.01); *G06T 2207/30168* (2013.01); *G06T 2207/30201* (2013.01)

(58) Field of Classification Search
CPC ......... G06F 3/013; G06F 3/015; G06V 40/18; G06V 40/19; A61B 5/163; A61B 3/14; A61B 3/0033; G06T 7/0002; G06T 7/20; G06T 2207/30201
See application file for complete search history.

(56) References Cited

U.S. PATENT DOCUMENTS

| | | | | |
|---|---|---|---|---|
| 5,926,655 | A * | 7/1999 | Irie | ........................ G03B 13/02 396/51 |
| 9,468,372 | B2 * | 10/2016 | Pugh | ........................ G02C 7/04 |
| 10,417,495 | B1 * | 9/2019 | Davami | ................ G06V 40/19 |
| 2003/0169907 | A1 | 9/2003 | Edwards | |
| 2016/0132726 | A1 * | 5/2016 | Kempinski | ............ G06V 40/19 382/117 |
| 2018/0246320 | A1 | 8/2018 | Rana et al. | |
| 2019/0141458 | A1 | 5/2019 | Wendt | |

(Continued)

FOREIGN PATENT DOCUMENTS

| | | |
|---|---|---|
| EP | 2608546 A1 | 6/2013 |
| WO | 2004034905 A1 | 4/2004 |

(Continued)

OTHER PUBLICATIONS

Schmidt, Jurgen et al., Eye Blink Detection for Different Driver States in Conditionally Automated Driving and Manual Driving Using EOG and a Driver Camera. Behaviour Research Methods, Springer US, New York, vol. 50, No. 3, Jul. 17, 2017. pp. 1088-1101. XP036548783. DOI: 10.3758/S13428-017-0928-0.

(Continued)

*Primary Examiner* — Shefali D Goradia
(74) *Attorney, Agent, or Firm* — Christopher Ignatius Moylan

(57) ABSTRACT

An eye tracking system receives a blink signal that represents whether or not a blink has been detected in a current image. The eye tracking system receives a quality indicator that represents a quality of data in the current image. The eye tracking system sets a validated blink signal to a validated blink value if (1) the blink signal indicates that a blink has been detected; and (2) the quality indicator is less than a validated blink threshold.

20 Claims, 10 Drawing Sheets

(56)                    References Cited

U.S. PATENT DOCUMENTS

| | | | |
|---|---|---|---|
| 2019/0205607 A1 | 7/2019 | Hong | |
| 2020/0022577 A1* | 1/2020 | Rishoni | A61B 3/032 |
| 2020/0372678 A1* | 11/2020 | Farmer | G06T 7/77 |
| 2021/0173479 A1* | 6/2021 | Klingström | G06V 40/20 |

FOREIGN PATENT DOCUMENTS

| | | | |
|---|---|---|---|
| WO | 2019050543 A1 | 3/2019 |
| WO | 2019055839 A2 | 3/2019 |
| WO | 2020044180 A2 | 3/2020 |
| WO | 2021112282 A1 | 6/2021 |

OTHER PUBLICATIONS

Swedish search report completed Mar. 3, 2022 regarding patent application SE 2150853-6.
Extended European search report completed Nov. 11, 2022 regarding patent application EP 22 18 0462.

* cited by examiner

*112*

*111*

*113*

*110*

*120*

*114*

*119*

*115*

*118*

*116*

*100*

*126*   *117*   *127*

*128*

*228*    *230*        *229*        *236*    *234*

*232*            *238*

EYE TRACKING SYSTEM

CROSS-REFERENCES TO RELATED APPLICATIONS

This application claims priority to Swedish Application No. 2150853-6, entitled "AN EYE TRACKING SYSTEM," filed on Jun. 30, 2021. The entire disclosure of the above-referenced application is incorporated herein by this reference.

FIELD

The present disclosure generally relates to the field of eye tracking. In particular, the present disclosure relates to eye tracking systems and methods for validating detected blink.

BACKGROUND

In eye tracking applications, digital images are retrieved of the eyes of a user and the digital images are analysed in order to estimate the gaze direction of the user. The estimation of the gaze direction may be based on computer-based image analysis of features of the imaged eye. One known example method of eye tracking includes the use of infrared light and an image sensor. The infrared light is directed towards the pupil of a user and the reflection of the light is captured by an image sensor.

Many eye tracking systems estimate gaze direction based on identification of a pupil position together with glints or corneal reflections. Therefore, accuracy in the estimation of gaze direction may depend upon an accuracy of the identification or detection of the pupil position and/or the corneal reflections. One or more spurious image features such as stray reflections may be present in the digital images which can detrimentally affect eye feature identification. For example, spurious image features can result in incorrect glint to illuminator matching and/or an incorrect pupil position, resulting in an erroneous gaze determination. It can be difficult to determine when such errors have occurred and eye tracking systems can get stuck in an erroneous tracking sequence.

Portable or wearable eye tracking devices have also been previously described. One such eye tracking system is described in U.S. Pat. No. 9,041,787 (which is hereby incorporated by reference in its entirety). A wearable eye tracking device is described using illuminators and image sensors for determining gaze direction.

SUMMARY

According to a first aspect of the present disclosure there is provided an eye tracking system comprising a controller configured to: receive a blink-signal that represents whether or not a blink has been detected in a current-image; receive a quality-indicator that represents the quality of data in the current-image; and set a validated-blink-signal to a validated-blink-value if: the blink-signal indicates that a blink has been detected; and the quality-indicator is less than a validated-blink-threshold. Advantageously, such an eye tracking system does not validate any (unvalidated) blink detections that identified by the blink-signal that do not significantly affect the quality of the image (as defined by the quality-indicator). Therefore, validated blink detection only occurs when the detected blink has had a significant detrimental effect on the quality of the current-image. This enables improved performance of a downstream processing operation such as a gaze tracker, as discussed in detail below.

The quality-indicator may comprise a confidence-value associated with an output of a pupil detection algorithm that is applied to the current-image. The controller may be further configured to: set a quality-indicator-baseline based on the quality-indicator for one or more previous images; and set the validated-blink-threshold based on the quality-indicator-baseline. The controller may be further configured to: set the quality-indicator-baseline based on the quality-indicator for one or more previous images for which the blink-signal indicates that a blink has not been detected. The controller may be further configured to: set the quality-indicator-baseline based on the quality-indicator for one or more previous images for which: i) the blink-signal indicates that a blink has been detected, and ii) the quality-indicator is higher than a baseline-update-threshold.

The controller may be further configured to set the validated-blink-threshold as the higher of: the quality-indicator-baseline minus a min_required_confidence_drop; and a minimum-validated-blink-threshold-level. The min_required_confidence_drop may be a minimum drop in the quality-indicator below the quality-indicator-baseline that will result in the quality-indicator being considered too low (i.e. less than the validated-blink-threshold). The controller may be further configured to: set the quality-indicator-baseline based on the quality-indicators of a plurality of previous images. The controller may be further configured to: set the quality-indicator-baseline based on a filtered combination of the quality-indicators of the plurality of previous images.

The controller may be further configured to: determine if the blink-signal indicates that a blink has been detected; if the blink-signal indicates that a blink has been detected, then determine if the quality-indicator is less than the validated-blink-threshold; and if the quality-indicator is less than the validated-blink-threshold, then set the validated-blink-signal to the validated-blink-value. The controller may be further configured to: set the validated-blink-signal to a no-blink-value if the blink-signal indicates that a blink has not been detected. The controller may be further configured to: set the validated-blink-signal to the no-blink-value if the blink-signal indicates that a blink has not been detected, irrespective of whether or not the quality-indicator is greater than the validated-blink-threshold. The controller may be further configured to set the validated-blink-signal to the no-blink-value if: the blink-signal indicates that a blink has not been detected; or the quality-indicator is greater than the validated-blink-threshold.

The eye tracking system may further comprise: a gaze tracker that is configured to apply a gaze tracking algorithm, wherein the gaze tracker is configured to: for an image for which the associated validated-blink-signal does not have a validated-blink-value: apply the gaze tracking algorithm in order to provide an updated gaze-signal for the image; and for an image for which the associated validated-blink-signal does have a validated-blink-value: provide a gaze-signal for the image based on the gaze-signal for one or more previous images. The quality-indicator may comprise one or more of: a gaze-quality-parameter associated with a gaze-signal that is provided as an output of a gaze tracking algorithm that is applied to the current-image; a pupil-contrast-indicator that represents the contrast between the pupil and other features of the eye in the current-image; a confidence-value associated with a determined position of the cornea in the current-image; and a gaze-signal that is provided as an output of a gaze tracking algorithm that is applied to the current-image, for comparison with one or more validated-blink-thresholds to determine if the gaze-signal is out of bounds.

There is also provided a head-mounted device comprising any eye tracking system disclosed herein. According to a further aspect of the disclosure, there is provided a method of operating an eye tracking system, the method comprising: receiving a blink-signal that represents whether or not a blink has been detected in a current-image; receiving a quality-indicator that represents the quality of data in the current-image; and setting a validated-blink-signal to a validated-blink-value if: the blink-signal indicates that a blink has been detected; and the quality-indicator is less than a validated-blink-threshold. According to a further aspect of the disclosure, there is provided one or more non-transitory computer-readable storage media storing computer-executable instructions that, when executed by a computing system, causes the computing system to perform any method disclosed herein.

BRIEF DESCRIPTION OF THE DRAWINGS

One or more embodiments will now be described by way of example only with reference to the accompanying drawings in which.

DETAILED DESCRIPTION OF THE INVENTION

Figures 1, 2:
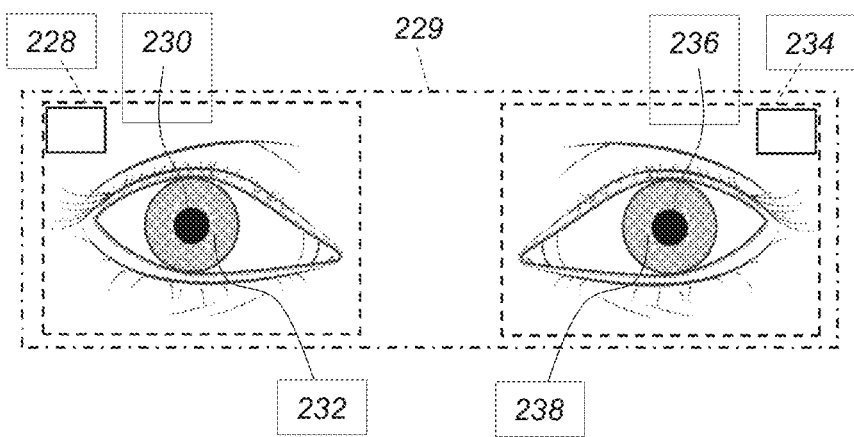
FIG. 1 shows a schematic view of an eye tracking system which may be used to capture a sequence of images that can be used by example embodiments.
FIG. 2 shows an example image of a pair of eyes.

FIG. 1 shows a simplified view of an eye tracking system 100 (which may also be referred to as a gaze tracking system) in a head-mounted device in the form of a virtual or augmented reality (VR or AR) device or VR or AR glasses or anything related, such as extended reality (XR) or mixed reality (MR) headsets. The system 100 comprises an image sensor 120 (e.g. a camera) for capturing images of the eyes of the user. The system may optionally include one or more illuminators 110-119 for illuminating the eyes of a user, which may for example be light emitting diodes emitting light in the infrared frequency band, or in the near infrared frequency band and which may be physically arranged in a variety of configurations. The image sensor 120 may for example be an image sensor of any type, such as a complementary metal oxide semiconductor (CMOS) image sensor or a charged coupled device (CCD) image sensor. The image sensor may consist of an integrated circuit containing an array of pixel sensors, each pixel containing a photodetector and an active amplifier. The image sensor may be capable of converting light into digital signals. In one or more examples, it could be an Infrared image sensor or IR image sensor, an RGB sensor, an RGBW sensor or an RGB or RGBW sensor with IR filter.

The eye tracking system 100 may comprise circuitry or one or more controllers 125, for example including a receiver 126 and processing circuitry 127, for receiving and processing the images captured by the image sensor 120. The circuitry 125 may for example be connected to the image sensor 120 and the optional one or more illuminators 110-119 via a wired or a wireless connection and be co-located with the image sensor 120 and the one or more illuminators 110-119 or located at a distance, e.g. in a different device. In another example, the circuitry 125 may be provided in one or more stacked layers below the light sensitive surface of a light sensor.

The eye tracking system 100 may include a display (not shown) for presenting information and/or visual stimuli to the user. The display may comprise a VR display which presents imagery and substantially blocks the user's view of the real-world or an AR display which presents imagery that is to be perceived as overlaid over the user's view of the real-world.

The location of the image sensor 120 for one eye in such a system 100 is generally away from the line of sight for the user in order not to obscure the display for that eye. This configuration may be, for example, enabled by means of so-called hot mirrors which reflect a portion of the light and allows the rest of the light to pass, e.g. infrared light is reflected, and visible light is allowed to pass.

While in the above example the images of the user's eye are captured by a head-mounted image sensor 120, in other examples the images may be captured by an image sensor that is not head-mounted. Such a non-head-mounted system may be referred to as a remote system.

In an eye tracking system, a gaze signal can be computed per each eye of the user (left and right). The quality of these gaze signals can be reduced by disturbances in the input images (such as image noise) and by incorrect algorithm behaviour (such as incorrect predictions). A goal of the eye tracking system is to deliver a gaze signal that is as good as possible, both in terms of accuracy (bias error) and precision (variance error). For many applications it can be sufficient to deliver only one gaze signal per time instance, rather than both the gaze of the left and right eyes individually. Further, the combined gaze signal can be provided in combination with the left and right signals. Such a gaze signal can be referred to as a combined gaze signal.

FIG. 2 shows a simplified example of an image 229 of a pair of eyes, captured by an eye tracking system such as the system of FIG. 1. The image 229 can be considered as including a right-eye-image 228, of a person's right eye, and a left-eye-image 234, of the person's left eye. In this example the right-eye-image 228 and the left-eye-image 234 are both parts of a larger image of both of the person's eyes. In other examples, separate image sensors may be used to acquire the right-eye-image 228 and the left-eye-image 234.

The system may employ image processing (such as digital image processing) for extracting features in the image. The system may for example identify the location of the pupil 230, 236 in the one or more images captured by the image sensor. The system may determine the location of the pupil 230, 236 using a pupil detection process. The system may also identify corneal reflections 232, 238 located in close proximity to the pupil 230, 236. The system may estimate a corneal centre or eye ball centre based on the corneal reflections 232, 238. For example, the system may match each of the individual corneal reflections 232, 238 for each eye with a corresponding illuminator and determine the corneal centre of each eye based on the matching. The system can then determine a gaze ray (which may also be referred to as a gaze vector) for each eye including a position vector and a direction vector. The gaze ray may be based on a gaze origin and gaze direction which can be determined from the respective glint to illuminator matching/corneal centres and the determined pupil position. The gaze direction and gaze origin may themselves be separate vectors. The gaze rays for each eye may be combined to provide a combined gaze ray.

As mentioned above, any errors in glint to illuminator matching (which may simply be referred to as glint matching) or pupil position determination can result in an incorrect gaze determination. The results of glint matching and pupil detection can be considered as binary. For glint matching, either the glint matching is correct and a cornea position is determined that is good enough for accurate gaze computation, or it is incorrect which results in a cornea position that cannot be used to accurately map gaze. Similarly, for pupil detection, either the detected pupil is close enough for circle fitting to accurately identify a pupil, or it is incorrect such that the correct pupil cannot be identified and cannot be used to accurately map gaze. However, errors in determining these intermediate parameters can be difficult to detect. As a result, some systems can get stuck in an incorrect tracking regime and provide an insufficient gaze determination. This can be particularly detrimental for many eye tracking applications.

In particular, gaze estimation is often very unstable during blinking and squinting. This causes significant problems for foveated rendering, in which an image quality is reduced in the user's peripheral vision as determined by their calculated gaze. In the use case of foveated rendering, unstable gaze estimation will cause the foveation area to jump, causing noticeable graphic artifacts and a bad user experience. This can be mitigated by using a blink detector to lock the foveation area during a blink.

Blink detection can also be used within the application of social interactions in VR since it allows for a more complete visualization of the eyes of a virtual avatar.

In order to detect blinks fast enough for locking the foveation area, blink detectors can be tuned to be sensitive, but this can cause false blink detections due to semi-blinks, squinting or saccades. Any amount false positive blink detections are undesirable. In the use case that relates to foveated rendering, the foveation area can get locked where the user is not focusing thereby causing a bad user experience due to poor resolution or graphic artifacts. In the use case of visualising blinks on an avatar, a false blink detection will cause the avatar to blink even though the user is not.

Figure 3:
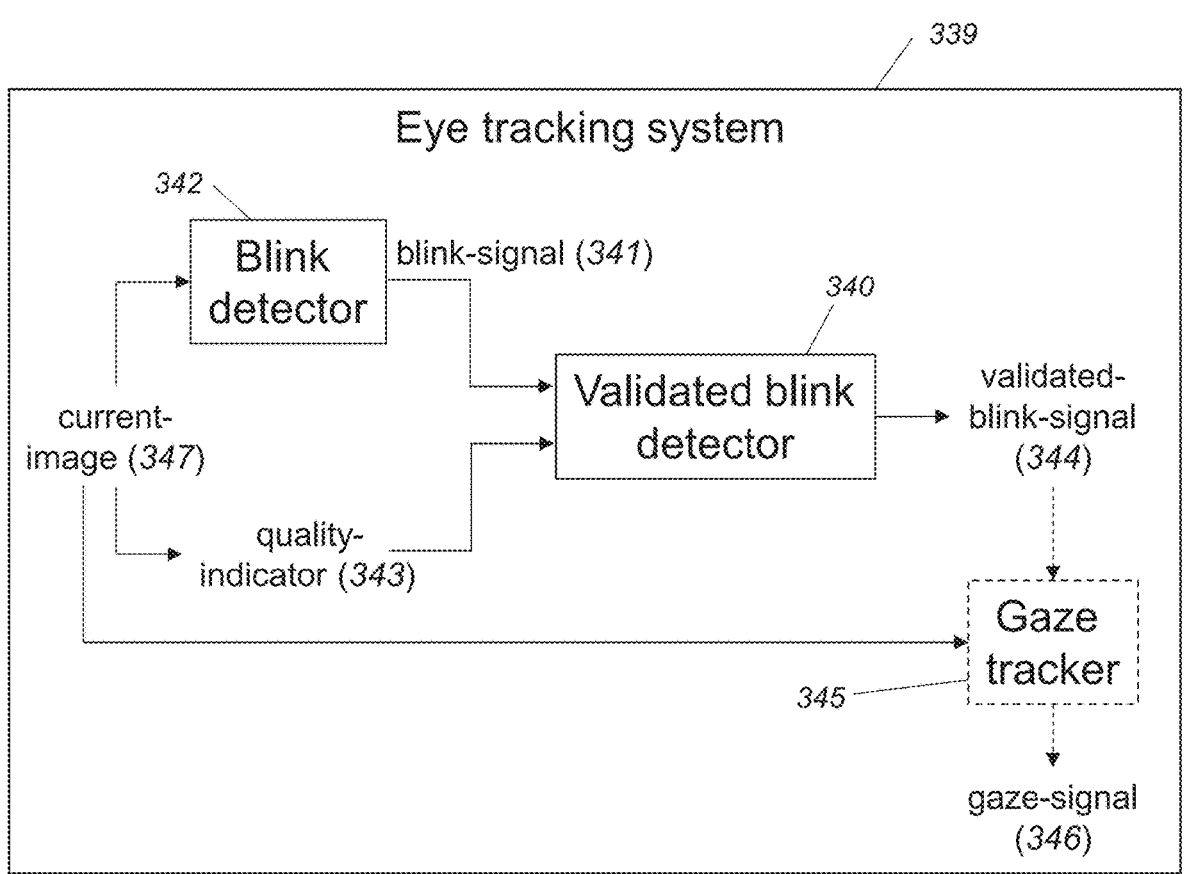
FIG. 3 shows an example of an eye tracking system according to an embodiment of the present disclosure.

FIG. 3 shows an example of an eye tracking system 339 according to an embodiment of the present disclosure. The functionality that is illustrated in FIG. 3 may be provided by one or more controllers. The eye tracking system 339 may be part of, or associated with, a head-mounted device or a remote system.

The eye tracking system 339 includes a validated blink detector 340 that receives a blink-signal 341. The blink-signal 341 represents whether or not a blink has been detected in a current-image 347. The current-image 347 is an image of an eye of a user, and can be considered as the most recently received image in a stream of images/frames. The blink-signal 341 in one implementation can take one of the following two values: TRUE, to indicate that a blink has been detected; and FALSE, to indicate that a blink has not been detected. In this example, the blink-signal 341 is provided as the output of a blink detector 342. Any blink detector 342 that is known in the art can be used to provide the blink-signal 341 for the validated blink detector 340. The blink detector 342 may or may not be considered to be part of the eye tracking system 339. That is, in some examples the blink detector 342 can be provided separately from the eye tracking system 339.

The validated blink detector 340 also receives a quality-indicator 343 that represents the quality of data in the current-image 347. As will be discussed in detail below, the quality-indicator 343 can represent the quality of data that can be extracted from the current-image 347, such as a confidence-value associated with an output of a pupil detection algorithm that is applied to the current-image 347. Beneficially the quality-indicator 343 can represent the quality of specific data in the current-image 347 that is expected to be affected by a blink. The output of a pupil detection algorithm is one example such specific data because the pupil will become gradually occluded by the blink and therefore will become undetectable.

The validated blink detector 340 can then set a validated-blink-signal 344 to a validated-blink-value (e.g. TRUE) if: i) the blink-signal 341 indicates that a blink has been detected; and ii) the quality-indicator 343 is less than a validated-blink-threshold. In this way, the validated-blink-signal 344 is only set as the validated-blink-value when the blink detector detects a blink (as represented by the blink-signal 341) AND the quality-indicator 343 drops to a relatively low level. Therefore, any blink detections that are made by the blink detector 342 that do not significantly affect the quality of the image (as defined by the quality-indicator 343) are not validated as blinks, such that the validated-blink-signal 344 is not set to a validated-blink-value. Therefore, the validated blink detection can be considered as providing a potentially delayed version of the blink detection that is performed by the blink detector 342, such that the validated blink detection is only flagged when the detected blink has had a significant detrimental effect on the quality of the current-image 347.

In the example of FIG. 3, the eye tracking system 339 also includes a gaze tracker 345. The gaze tracker 345 can apply a gaze tracking algorithm to provide a gaze-signal 346 as an output, for example to estimate a gaze direction from an image of a user's eye. Gaze trackers 345 and gaze tracking algorithms are known in the art. In the example of FIG. 3, the gaze tracker 345 receives the validated-blink-signal 344 from the validated blink detector 340. For a current-image 347 for which the associated validated-blink-signal 344 does not have a validated-blink-value: the gaze tracker 345 applies the gaze tracking algorithm in order to provide an updated gaze-signal 346 for the current-image 347. For a current-image 347 for which the associated validated-blink-signal 344 does have a validated-blink-value: the gaze tracker 345 provides a gaze-signal 346 for the current-image 347 based on the gaze-signal for one or more previous images. In this way, the gaze-tracker 345 does not update the gaze-signal 346 for a current-image 347 that has a validated blink because there is a risk that the gaze-signal 346 will not be accurately calculated. Instead, the gaze tracker 345 can maintain (or adapt) an earlier gaze-signal such that a gaze-signal 346 is still provided as an output, but it is not based on the most recent current-image 347 (that is considered potentially erroneous). As discussed above, an incorrectly calculated gaze-signal 346 can be particularly problematic in foveated rendering applications, for example.

Figure 4:
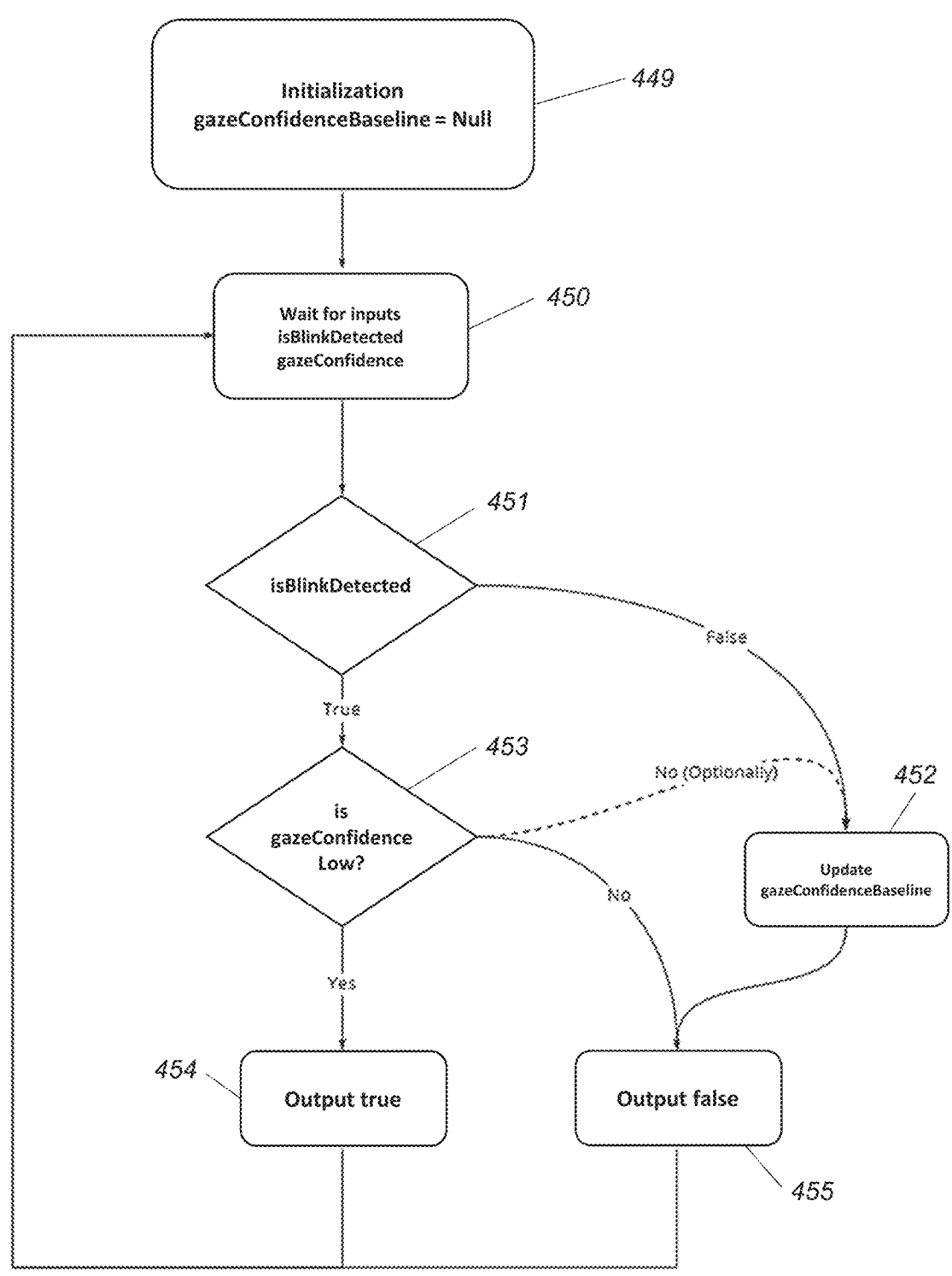
FIG. 4 illustrates schematically a process flow that can be performed by an eye tracking system of the present disclosure.

FIG. 4 illustrates schematically a process flow that can be performed by an eye tracking system of the present disclosure. For example, the process flow of FIG. 4 can be performed by the validated blink detector of FIG. 3.

The process begins at step 449 with an initialization step. In this initialization step a variable that is labelled as gazeConfidenceBaseline is set to a null value.

Following initialization, the process moves to step 450 to wait for two inputs: a first input that is labelled isBlinkDetected, which corresponds to the blink-signal in FIG. 3; and a second input that is labelled gazeConfidence, which is an example of the quality-indicator in FIG. 3. The gazeConfidence input is a confidence-value associated with an output of a pupil detection algorithm or a glint matching algorithm. US 2021/0011550 A1 provides examples of how such a confidence-value can be determined.

Once the two inputs are received at step 450 for a received current-image, the process moves on to step 451 to check the state of the isBlinkDetected input. If the isBlink Detected input is False (and therefore a blink has not been detected), then the process moves on to step 452 to update the gazeConfidenceBaseline variable. (Further details of how the gazeConfidenceBaseline can be updated will be provided below.) If the isBlinkDetected input is True (and therefore a blink has been detected), then the process moves on to step 453.

At step 453, the process checks the state of the gazeConfidence input. If the gazeConfidence is low (that is, it is less than a validated-blink-threshold), then the process moves on to step 454 in order to set the validated-blink-signal as 'true' ('true' is an example of a validated-blink-value). If the gazeConfidence is not low (that is, it is not less than the validated-blink-threshold), then the process moves on to step 455 in order to set the validated-blink-signal as 'false' ('false' is an example of a no-blink-value).

In another example the processing at steps 451 and 453 can be switched around such that the process first checks the state of the gazeConfidence input, and only moves on to checking the state of the isBlinkDetected input if the gazeConfidence input is low.

Optionally, if the gazeConfidence is low then the process can move on to step 452 before step 455. As indicated above, at step 452 the gazeConfidenceBaseline variable is updated. In this way, the gazeConfidenceBaseline variable can be updated: i) if no blink is detected (as determined at step 451); and ii) if a (unvalidated) blink is detected (as determined at step 451) but the gazeConfidence is not low (as determined at step 453). Therefore the gazeConfidenceBaseline variable can be updated for each current-image that is expected to have sufficient quality such that a meaningful gazeConfidence/quality-indicator can be extracted from it.

FIGS. 5 to 9 illustrate plots that will used to describe an example of how the validated-blink-threshold can be dynamically set in order to improve the performance of a validated blink detector, such as the one that is described with reference to FIG. 3.

The validated-blink-threshold for the quality-indicator can be calculated as the result of any function that depends on historical gaze confidence values, or other signals. In this way, as will be discussed in detail below, the validated-blink-threshold can be set at a value that is suitable for the particular user and for the particular properties of the image (such as the brightness, exposure, contrast or any other property of the image that can affect the "quality" of the image and the ability for data to be extracted from the image).

In the implementation that will be illustrated with reference FIGS. 5 to 9 the quality-indicator is a gaze-confidence-value, and the validated-blink-threshold is calculated as:

$$\text{validated-blink-threshold} = \max(\text{min\_threshold}, \text{gaze\_confidence\_baseline} - \text{min\_required\_confidence\_drop})$$

where:

min_threshold is a minimum value for validated-blink-threshold. In this example the min-threshold is set at 750; gaze_confidence_baseline is a low pass filtered and delayed value of the gaze-confidence-value, and represents a baseline that will be used for determining if a gaze-confidence-value is too low based on previously received images; and min_required_confidence_drop is a minimum drop in the gaze-confidence-value below the gaze_confidence_baseline that will result in the gaze-confidence-value being considered too low. In this example the min_required_confidence_drop is set at 700. In another example it can be set as a proportion of the gaze_confidence_baseline instead of an absolute number, such as 20% (or any other percentage) of the gaze_confidence_baseline.

The gaze-confidence-value is typically [−1000, 2000] for this implementation.

Figure 5:
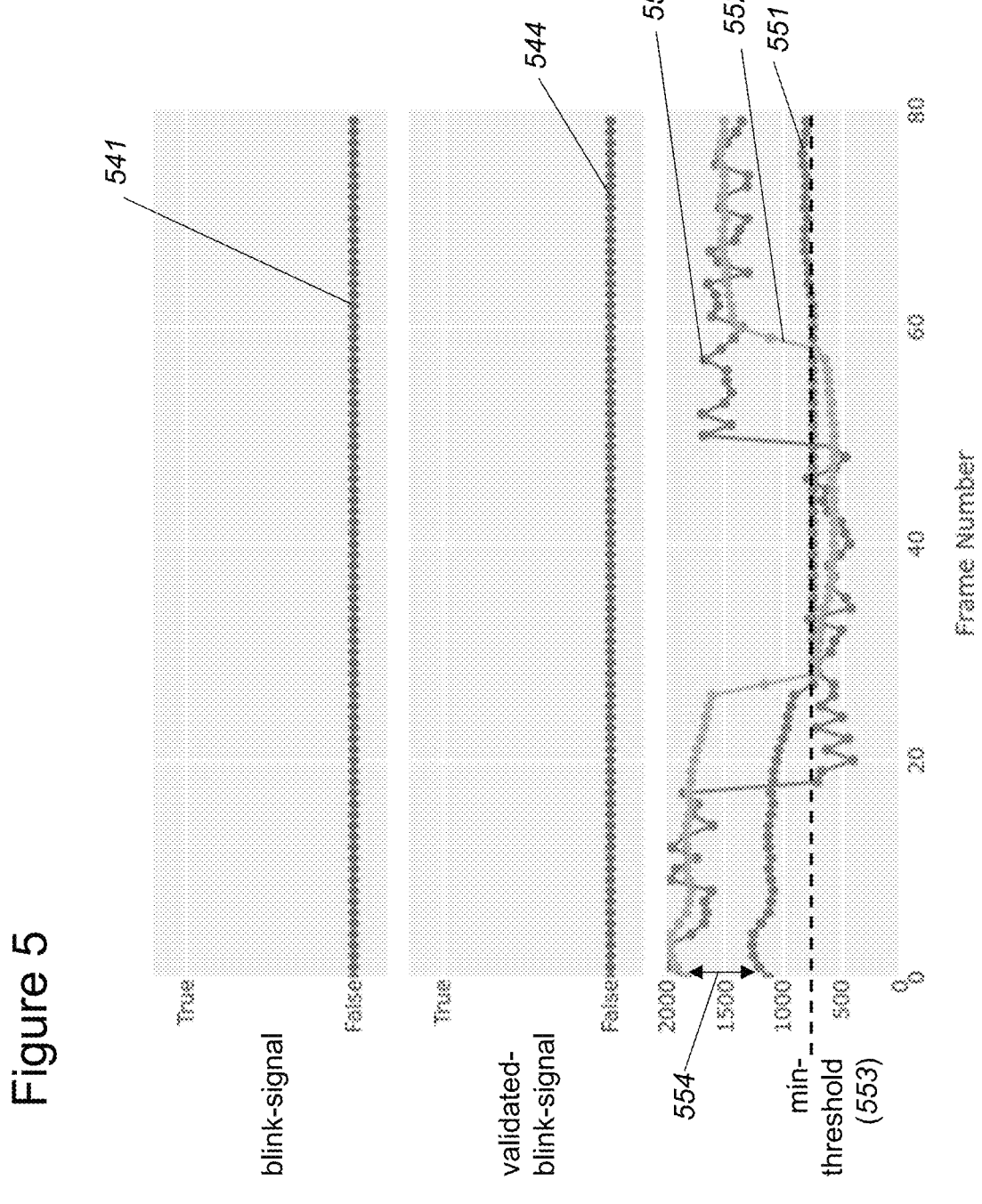
FIG. 5 illustrates a plot that will used to describe an example of how the validated-blink-threshold can be dynamically set.

Turning now to FIG. 5, the horizontal axis represents a frame number in a stream/sequence of images/frames.

The uppermost plot in FIG. 5 is a blink-signal 541. The blink-signal 541 can be provided by a blink detector in the same way that is described with reference to FIG. 3. In FIG. 5, the blink-signal 541 has a no-blinking-value (False) for each of the 80 frames that are represented on the horizontal axis.

The middle plot in FIG. 5 is a validated-blink-signal 544. The validated-blink-signal 544 is the output of the validated blink detector that is described with reference to FIG. 3. In FIG. 5, the validated-blink-signal 544 also has a no-blinking-value (False) for each of the 80 frames that are represented on the horizontal axis.

The lower plot in FIG. 5 shows various signals that will be used to describe how the validated-blink-threshold 551 is set. A first line in the lower plot, that is labelled with reference 550, represents the gaze-confidence-value. It can be seen that the gaze-confidence-value 550 fluctuates slightly between about 2,000 and 1,500 through the first 17 frames, and then drops significantly to values between about 400 and 800 up until the 48th frame that is represented in the plot. After the 48th frame, the gaze-confidence-value 550 increases to values between about 1,200 and 1,700 until the end of the plot.

A second line in the lower plot, that is labelled with reference 552, represents the gaze_confidence_baseline. As indicated above, the gaze_confidence_baseline 552 is calculated by low pass filtering a plurality of earlier values of the gaze-confidence-value 550. This can be seen in FIG. 5 because the gaze_confidence_baseline 552 is a smoothed and delayed version of the gaze-confidence-value 550. For instance the gaze-confidence-value 550 drops sharply at the 17th frame, whereas the gaze_confidence_baseline 552 drops slightly less sharply at the 26th frame.

Also shown in the lower plot of FIG. 5 is the min-threshold 553, which as indicated above takes a constant value of 750 in this example.

A third line in the lower plot, that is labelled with reference 551, represents the validated-blink-threshold. For the first 26 frames, the validated-blink-threshold 551 tracks the gaze_confidence_baseline 552 but is offset from it such that it is 700 less than the gaze_confidence_baseline 552. This ties in with the above equation where the min_required_ confidence_drop has a value of 700. The min_required_confidence_drop is identified schematically in FIG. 5 with reference 554.

After the 26th frame, the gaze_confidence_baseline 552 drops sharply such that if the validated-blink-threshold 551 were to continue tracking the gaze_confidence_baseline 552 (offset by the min_required_confidence_drop 554) it would drop below the min-threshold 553. The above equation prevents this from happening because it sets the validated-blink-threshold 551 as the higher of: the min_threshold 553; and the gaze_confidence_baseline 552 minus the min_required_confidence_drop 554. Between the $27^{th}$ and the $62^{nd}$ frames in FIG. 5, the min_threshold 553 is greater than the gaze_confidence_baseline 552 minus the min_required_confidence_drop 554. Therefore, the validated-blink-threshold 551 is set as the min_threshold 553 for the $27^{th}$ to the $62^{nd}$ frames. For the other frames it is set as the gaze_confidence_baseline 552 minus the min_required_confidence_drop 554.

The processing that is represented by the above equation and the lower plot in FIG. 5 can be generalised as setting a quality-indicator-baseline (gaze_confidence_baseline 552) based on the quality-indicator (gaze-confidence-value 550) for one or more previous images, and setting the validated-blink-threshold 551 based on the quality-indicator-baseline (gaze_confidence_baseline 552).

In the example of FIG. 5, the validated-blink-threshold 551 is set as the higher of: the quality-indicator-baseline (gaze_confidence_baseline 552); and a minimum-validated-blink-threshold-level (min_threshold 553). In this way, the validated-blink-threshold 551 is not set so low that a blink that is correctly identified by the blink-signal 541 is not ignored because the quality of the earlier images is poor.

Also in FIG. 5, the quality-indicator-baseline (gaze_confidence_baseline 552) is set based on the quality-indicators (gaze-confidence-values 550) of a plurality of previous images/frames. More particularly, the plurality of previous images/frames can immediately precede the current-image. In the example plots the gaze_confidence_baseline 552 is calculated as the median of the 20 most recent gaze-confidence-values 550, although it will be appreciated that alternative mathematical operators can be used instead, on any number of earlier gaze-confidence-values 550.

As discussed above, the gaze_confidence_baseline 552 is described as a low pass filtered and delayed value of the gaze-confidence-value 550. In this way, the process can be considered as setting a quality-indicator-baseline (gaze_confidence_baseline 552) based on a weighted/filtered combination of the quality-indicators (gaze-confidence-values 550) of a plurality of previous images. In some examples the weighted/filtered combination can be set as 0.9×previous value +0.1×current value and delay of 5 frames, which has been found to work well for an image refresh rate of 120 frames per second (fps).

Furthermore, as will be discussed with reference to the figures that follow, the quality-indicator-baseline (gaze_confidence_baseline 552) can be set based on the quality-indicator (gaze-confidence-value 550) for one or more previous images for which the blink-signal 541 indicates that a blink has not been detected. But the quality-indicator-baseline (gaze_confidence_baseline 552) is not updated based on the quality-indicator (gaze-confidence-value 550) for images for which the blink-signal 541 indicates that a blink has been detected.

10

Figure 6:
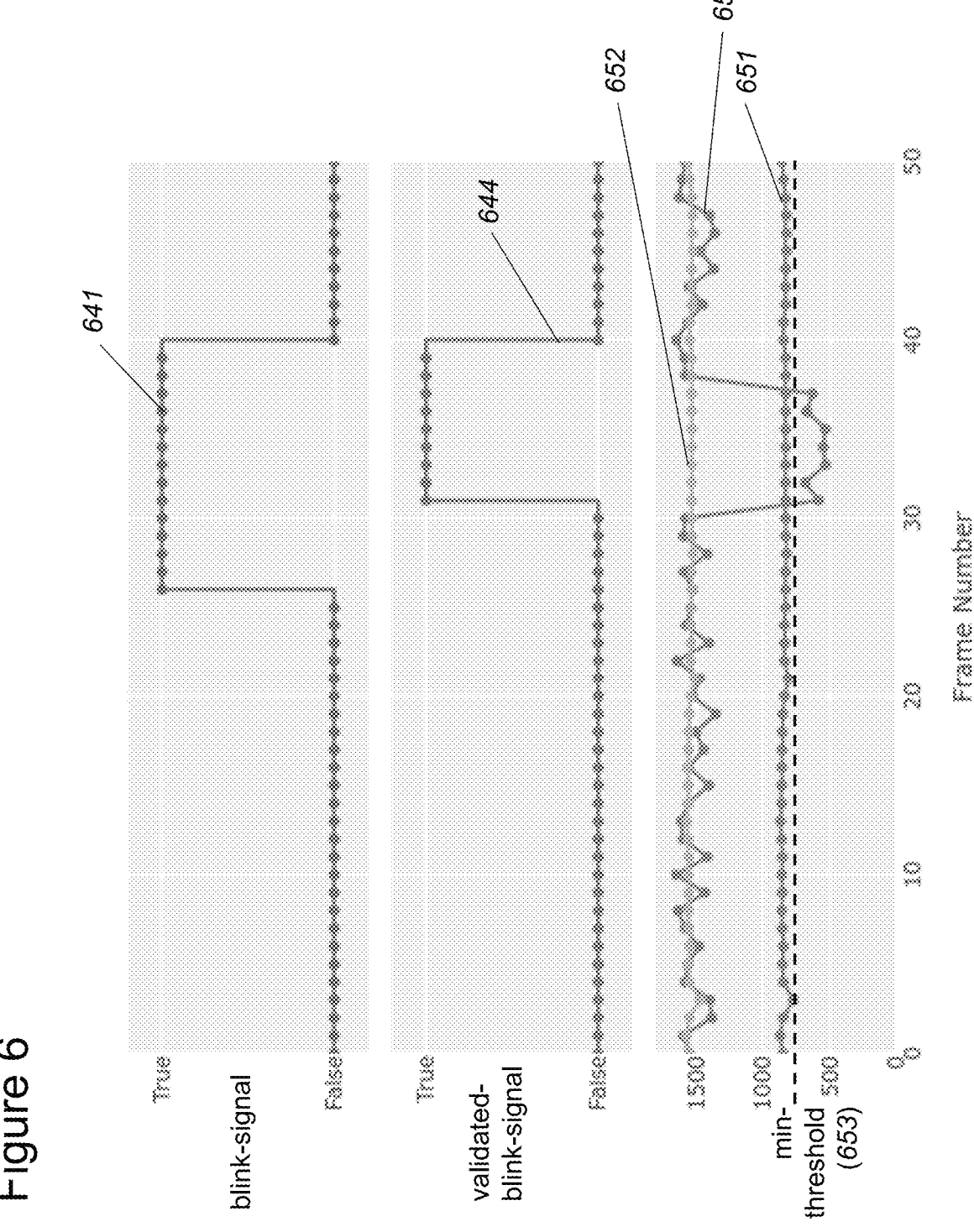
FIG. 6 shows plots of the same signals that are shown in FIG. 5, and illustrates a gaze confidence drop after the blink detection in the (unvalidated) blink-signal.

FIG. 6 shows plots of the same signals that are shown in FIG. 5. Each signal in FIG. 6 that is also shown in FIG. 5 has been given a corresponding reference number in the 600 series. In FIG. 6 the gaze confidence drops after the blink detection in the (unvalidated) blink-signal 641.

In FIG. 6 the blink-signal 641 transitions from False to True at the $26^{th}$ frame. At the $26^{th}$ frame the gaze-confidence-value 650 is higher than the validated-blink-threshold 651. Therefore, the validated-blink-signal 644 does not transition from False to True at the $26^{th}$ frame because the gaze-confidence-value 650 has not dropped too low; that is, the quality-indicator (gaze-confidence-value 650) is not less than the validated-blink-threshold 651.

At the $31^{st}$ frame in FIG. 6, the gaze-confidence-value 650 drops below the validated-blink-threshold 651, which causes the validated-blink-signal 644 to transition from False to True because the blink-signal 641 is still True.

In this example, the quality-indicator-baseline (gaze_confidence_baseline 652) is set based on the quality-indicator (gaze-confidence-value 650) in the same way as described above, but only if the blink-signal 641 indicates that a blink has not been detected. If the blink-signal 641 is True then the quality-indicator-baseline (gaze_confidence_baseline 652) in not updated. This is on the basis that the gaze-confidence-value 650 is potentially unreliable when a blink is detected and therefore the baseline should not be updated based on the associated images. That is, the quality-indicator-baseline (gaze_confidence_baseline 652) is not updated based on the quality-indicator (gaze-confidence-value 650) for images for which the blink-signal 641 indicates that a blink has been detected. As shown in FIG. 6 the validated-blink-threshold 651 has a fixed value between the $26^{th}$ and $39^{th}$ frames, when the blink-signal is True.

In another example the quality-indicator-baseline (gaze_confidence_baseline 652) can be set based on the quality-indicator (gaze-confidence-value 650) for one or more previous images for which: i) the blink-signal 641 indicates that a blink has been detected, and ii) the quality-indicator (gaze-confidence-value 650) is higher than a baseline-update-threshold (not shown). The baseline-update-threshold may or may not be the same as the validated-blink-threshold 651. If the baseline-update-threshold is the same as the validated-blink-threshold 651, then for the example of FIG. 6 this would mean that the gaze-confidence_baseline 652 would be updated between the $26^{th}$ and $30^{th}$ frames because the gaze-confidence-value 650 is high enough, but the validated-blink-signal 644 is not true.

Figure 7:
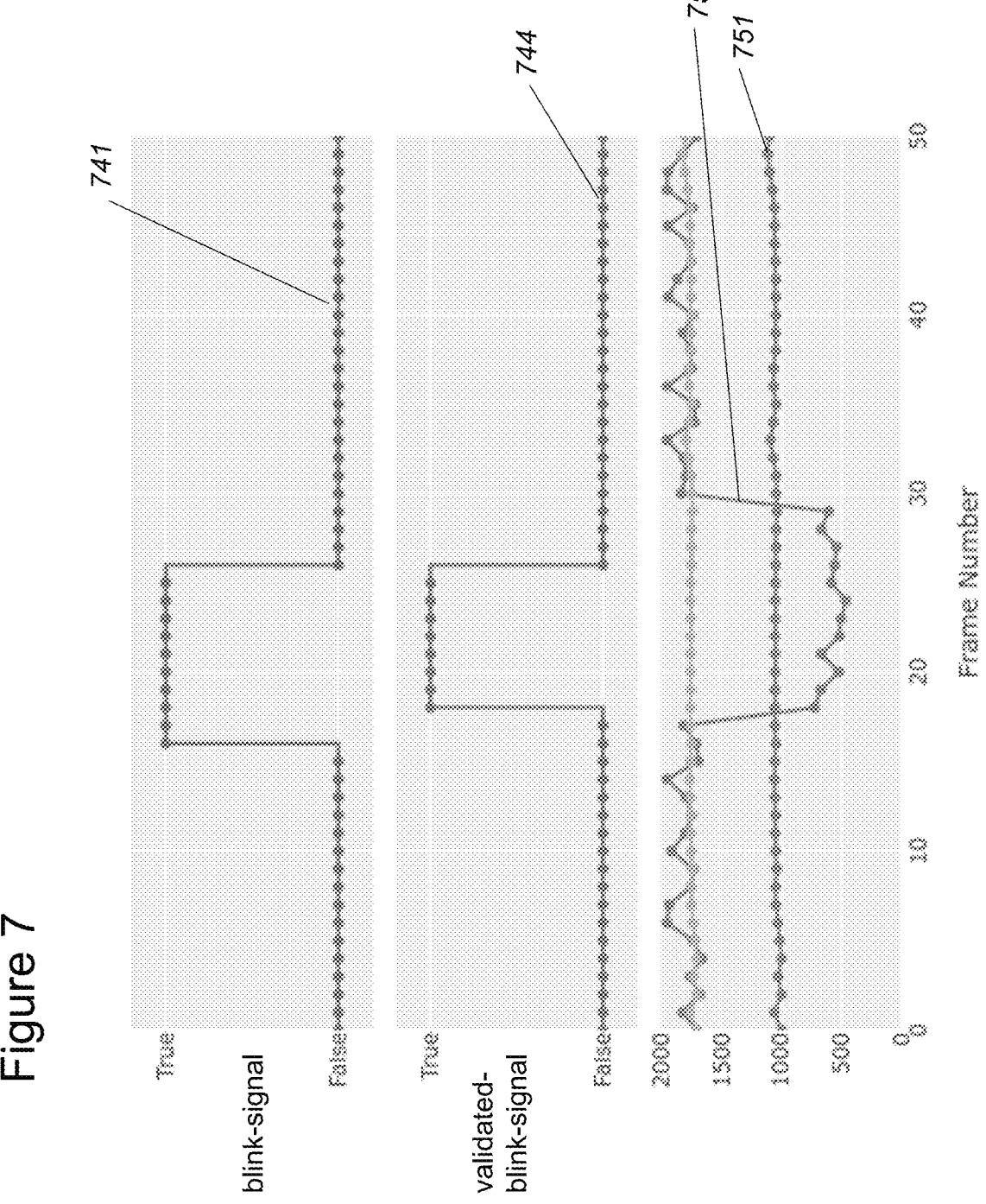
FIG. 7 shows plots of the same signals that are shown in FIG. 5, and illustrates a gaze confidence drop for longer than the blink detection in the (unvalidated) blink-signal.

FIG. 7 shows plots of the same signals that are shown in FIG. 5. Each signal in FIG. 7 that is also shown in FIG. 5 has been given a corresponding reference number in the 700 series. In FIG. 7 the gaze confidence drops for longer than the blink detection in the (unvalidated) blink-signal 741.

In FIG. 7 it can be seen that the blink-signal 741 changes from True to False to indicate the end of an (unvalidated) blink at the $26^{th}$ frame. In this example, this transition in the blink-signal 741 causes an immediate transition in the validated-blink-signal 744 from True to False. In this way, the validated-blink-signal 744 is set to a no-blink-value if the blink-signal 741 indicates that a blink has not been detected. This is irrespective of whether or not the quality-indicator (gaze-confidence-value 750) is greater than the validated-blink-threshold 751 (as is apparent from the plots of FIGS. 6 and 7).

Figure 8:
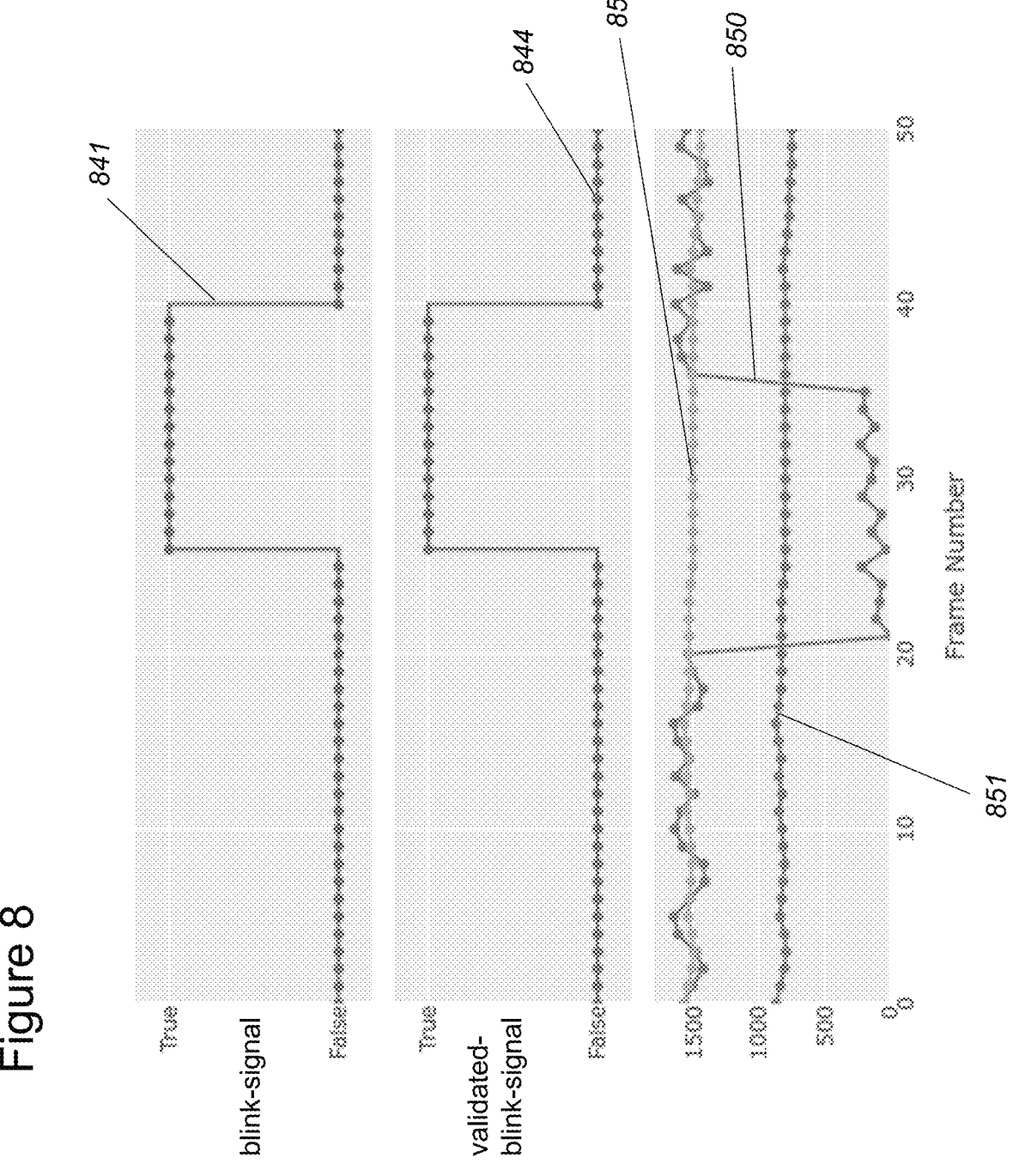
FIG. 8 shows plots of the same signals that are shown in FIG. 5, and illustrates a gaze confidence drop before the blink detection in the (unvalidated) blink-signal.

FIG. 8 shows plots of the same signals that are shown in FIG. 5. Each signal in FIG. 8 that is also shown in FIG. 5 has been given a corresponding reference number in the 800 series. In FIG. 8 the gaze confidence drops before the blink detection in the (unvalidated) blink-signal 841.

In FIG. 8 it can be seen that the gaze-confidence-value 850 drops below the validated-blink-threshold 851 at the 21$^{st}$ frame. However, since the blink-signal 841 is still False this does not trigger a change in the validated-blink-signal 844 from False to True. At the 26$^{th}$ frame the blink-signal 841 transitions from False to True. Since the gaze-confidence-value 850 is still less than the validated-blink-threshold 851 at the 26$^{th}$ frame, the validated-blink-signal 844 also transitions from False to True at the 26$^{th}$ frame.

FIG. 8 also shows how the gaze_confidence_baseline 852 is not updated for the period of time that the gaze-confidence-value 850 is less than the validated-blink-threshold 851 and/or the validated-blink-signal 844 is True (between the 21$^{st}$ and 40$^{th}$ frames).

Although not illustrated in FIG. 8, in some examples the validated-blink-signal 844 can be set as a no-blink-value (False) if the quality-indicator (gaze-confidence-value 850) is greater than the validated-blink-threshold 851, irrespective of whether or not the blink-signal 841 indicates that a blink has not been detected. For the plot of FIG. 8 this would result in the validated-blink-signal transitioning from True to False at the 36$^{th}$ frame. This is consistent with the process flow of FIG. 4.

Figure 9:
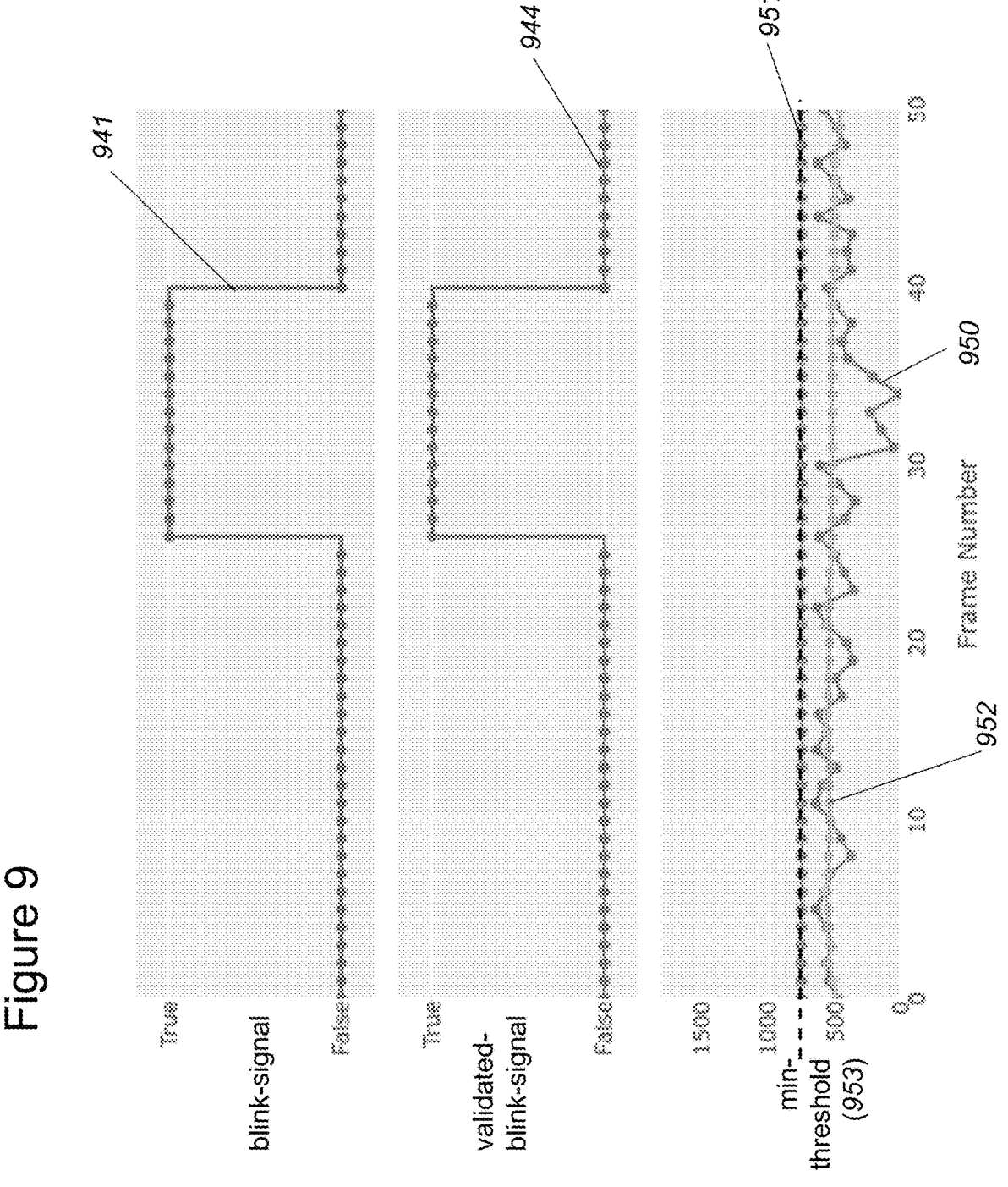
FIG. 9 shows plots of the same signals that are shown in FIG. 5, and illustrates a low gaze confidence baseline.

FIG. 9 shows plots of the same signals that are shown in FIG. 5. Each signal in FIG. 9 that is also shown in FIG. 5 has been given a corresponding reference number in the 900 series. In FIG. 9 the gaze confidence baseline is too low.

In FIG. 9 the gaze-confidence-value 950 is consistently low, irrespective of the state of the blink-signal. This may be caused by one of many reasons such as poor exposure in the image or poor pupil contrast (e.g. due to low image quality or some traits of the user), for example, and is not necessarily directly affected by whether or not there is a blink. Furthermore, such reasons for a low gaze-confidence-value 950 (or other quality-indicator) aren't necessarily linear and therefore they cannot readily be combined to provide an overall quality-indicator value. Since the gaze-confidence-value 950 is so low, the validated-blink-threshold 951 is fixed at the min-threshold 953 for the duration of the plot. Therefore, as soon as the blink-signal 941 transitions from False to True the validated-blink-signal 944 also transitions from False to True because the gaze-confidence-value 950 is already less than the validated-blink-threshold 951. This functionality can be useful because without the min-threshold 953 it could be impossible for the validated-blink-signal 944 to be set True. For instance, because the validated-blink-threshold 951 is so low (because it is offset from an already low gaze_confidence_baseline 952 by the min_required_confidence_drop) that the gaze-confidence-value 950 could never drop below it. Therefore, without the min-threshold a true blink might not be noticeable in the quality-indicator when it is already low.

As indicated above any of the quality-indicators described herein can be implemented in a number of different ways, including one or more of the following, either individually or in combination. Such a combination may be a mathematical combination or a logical combination (including AND and OR). Also such a combination may be a combination of quality-indicators for only one eye or for two eyes.

a gaze-quality-parameter associated with a gaze-signal that is provided as an output of a gaze tracking algorithm that is applied to the current-image. Gaze tracking algorithms can include any algorithms in the gaze estimation pipeline, including pupil detection and fitting, glint matching, cornea estimation, gaze mapping, etc.;

a gaze-signal that is provided as an output of a gaze tracking algorithm that is applied to the current-image, which can be compared with one or more validated-blink-thresholds to determine if the gaze-signal is out of bounds (for instance it has been calculated as an angle that is an impossibility for the human eye, such as greater than 35° or 40° from the centre of a field of view);

a confidence-value associated with an output of a pupil detection algorithm that is applied to the current-image;

a pupil-contrast-indicator that represents the contrast between the pupil and other features of the eye in the current-image, for instance the intensity difference between pixels inside the pupil and pixels outside the pupil edge, typically iris;

a pupil-intensity-indicator that represents the intensity of some or all pixels that are identified as part of an estimated pupil. If the values (or the average value) are low, typically 10-30 (where 255 is white, 0 is black), then it is probably a good pupil estimate. If the intensity value is not high, then it can be due to many reasons, but a low intensity value is likely a good pupil estimate and therefore representative of a good quality indicator. Therefore, a gaze-quality-indicator can be calculated using any function that increases whenever the pupil-intensity-indicator decreases so that it can be compared with a validated-blink-threshold to validate a blink. This may not hold true if the image is all black, in which case a combination of the pupil-contrast-indicator and the pupil-intensity-indicator can be used in order to determine whether or not to validate a blink;

a confidence-value associated with a determined position of the cornea in the current-image (the ability to detect the cornea will be affected by a blink);

a noise-value that represents a measurement of noise level in an estimated pupil location/radius, cornea position or gaze ray. A high noise level indicates low quality. Therefore, a gaze-quality-indicator can be calculated using any function that increases whenever the noise-value decreases so that it can be compared with a validated-blink-threshold to validate a blink; and an angle-difference between gaze rays for each of the left and right eyes. A high angle-difference indicates low quality. Therefore, a gaze-quality-indicator can be calculated using any function that increases whenever the angle-difference decreases so that it can be compared with a validated-blink-threshold to validate a blink.

In relation to the pupil-contrast-indicator example, the contrast may be truly low, i.e., the difference in intensity between pupil and iris is de facto low due to some trait of the eye. It may also be low due to the nature of how the pupil contrast is measured:

If the pupil is estimated incorrectly, the pixels that are identified as inside the pupil might actually not all be inside the actual pupil, and the pixels outside the pupil might not all be outside the actual pupil. This typically leads to a low contrast measurement.

If the eyelid is partially occluding the pupil then the eyelid intensity will be measured, and not the pupil intensity, in some pixel locations when measuring the intensity of the pupil. This also leads to a low contrast value.

Figure 10:
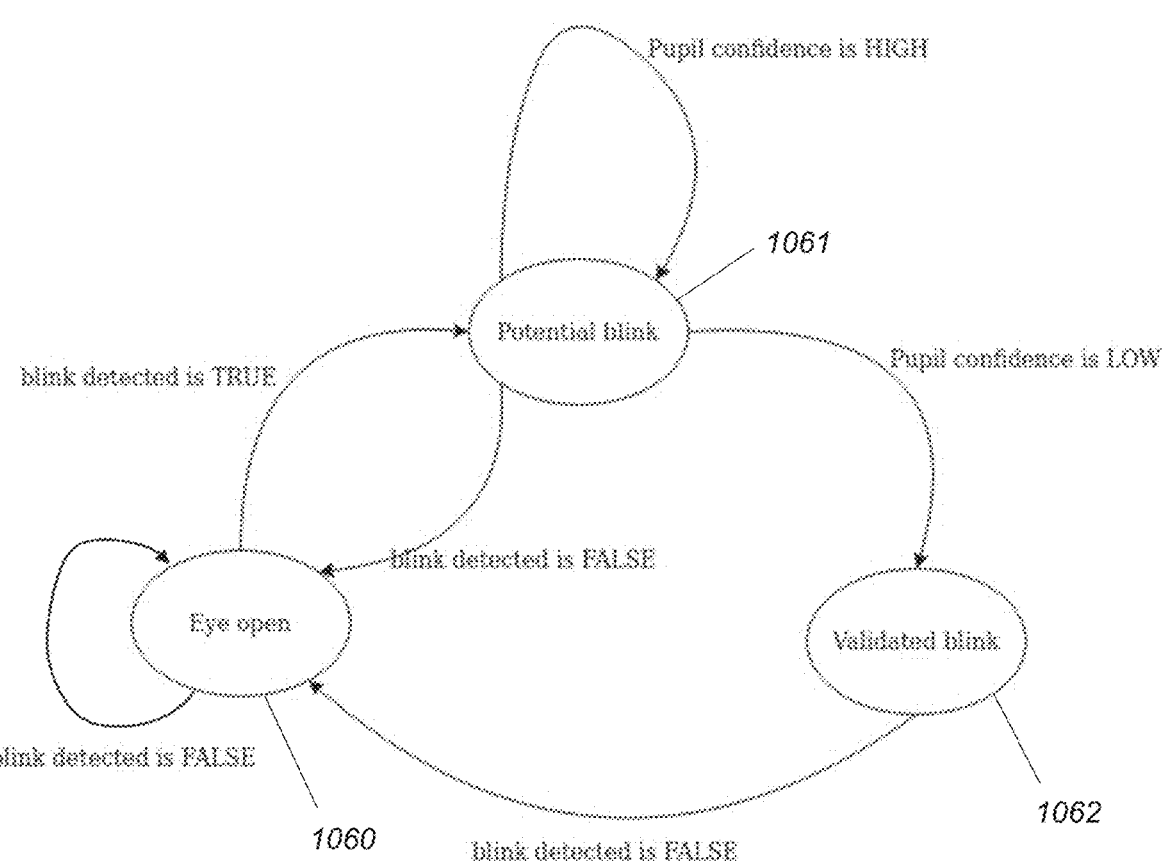
FIG. 10 illustrates an example algorithm of the present disclosure expressed as a state machine.

FIG. 10 illustrates an example algorithm of the present disclosure expressed as a state machine. The state machine has three states; "Eye open" 1060, "Potential blink" 1061, and "Validated blink" 1062. It uses two signals as inputs: a blink detection (true/false), which corresponds to the blink-signal described above; and a gaze confidence (scalar value), which corresponds to the quality-indicator/gaze-confidence-value described above. Both of these inputs can be obtained from other algorithms that are known in the art.

The steps of the algorithm are as follows:

1. Process the blink detection

If blink detection is false, go to "Eye open" 1060 regardless of state.

If blink detection is true and state is "Eye open" 1060, go to "Potential blink" 1061.

Otherwise do nothing.

1. Process the gaze confidence value

1. If state is "Potential blink" 1061 and the gaze confidence is less than a threshold (such as the validated-blink-threshold that depends on a baseline value), go to "Validated blink" 1062.

2. If state is "Eye open" 1060 update the gaze confidence baseline value using e.g. a moving average filter. Optionally: Update the gaze confidence baseline value also if state is "Potential blink" 1061.

3. (Optional) If state is "Validated blink" 1062 and the gaze confidence is greater than a threshold (such as the validated-blink-threshold that depends on a baseline value), go to "Potential blink" 1061. As discussed above, in some examples there can be an explicit requirement that the baseline itself must be above some limit.

Return "blink" if state is "Validated blink" 1062, otherwise return "no blink".

Figure 11:
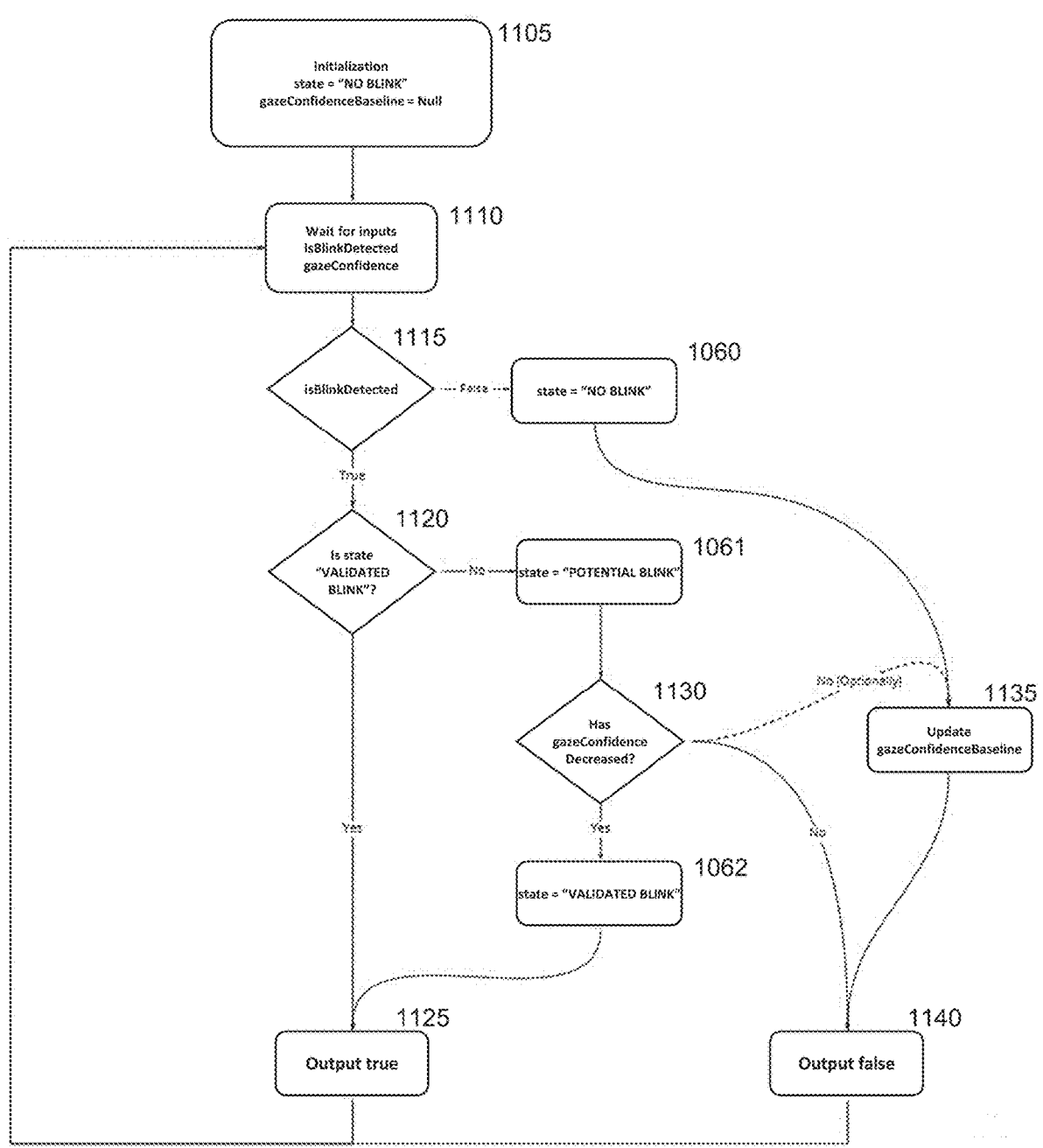
FIG. 11 illustrates the functionality of the state machine of FIG. 10 as a flow chart.

FIG. 11 illustrates the functionality of the state machine of FIG. 10 as a flow chart.

The state machine of FIG. 10 and the flow chart of FIG. 11 illustrate how the processing for entering the "Validated blink" state (and hence setting the validated-blink-signal to the validated-blink-value) can be performed sequentially. That is, the process can include the following steps: Following an initialization state of "No blink" and a null gazeConfindenceBaseline at step 1105, and after waiting for and receiving isBlinkDetected and GazeConfidence signals at step 1110, first determining at step 1115 if the blink-signal (isBlinkDetected) indicates that a blink has been detected. If the blink-signal indicates that no blink has been detected (i.e. isBlinkDetected is False), go to the Eye Open state (state=No Blink) 1060. If the blink-signal indicates that a blink has been detected (i.e. isBlinkDetected is True), then determining at step 1130 if the quality-in the quality-indicator is less than the validated-blink-threshold; and if the quality-indicator is less than the validated-blink-threshold (i.e. is state Validated Blink?). If it is determined that the quality-indicator is not less than the validated-blink-threshold (i.e. state Validated Blink is Yes), output True (i.e., blink is validated) at step 1125. However, if the quality-indicator is less than the validated-blink-threshold (i.e. pupil confidence is low) go to the Potential Blink state 1061. Then, if is determined at step 1130 that gazeConfidence has decreased, set[t] the validated-blink-signal to the validated-blink-value (entering the "Validated blink" state 1062) and outputting True (i.e., blink is validated) at step 1125.

If it is determined that at step 1130 that gaze confidence has decreased, the value False (blink no validated) is output at step 1140. From either the Eye Open (No Blink) state 1060 or after determining at step 1130 that gaze confidence has not decreased, the gaze confidence baseline value can be updated at step 1135 before the value False (blink not validated) is output at step 1140. From either step 1125 or step 1140, the process returns to step 1110 to wait for further isBlinkDetected and GazeConfidence signals.

Examples disclosed herein can reduce false positive blink detections and achieve a higher ratio between true positive and false positive detections. In turn, this can enable more sensitive blink detectors to be used thereby improving foveated rendering. By using a quality-indicator (such as a confidence measurement) to validate or filter out (unvalidated) blink detections, the (unvalidated) blink detections that are not causing any trouble are removed. This can be especially useful for a pupil locator. (Unvalidated) blinks that are detected too early can be postponed to a time when the pupil occlusion becomes large enough for the pupil detection to become unstable, as represented by a drop in the quality-factor.

What is claimed is:

1. An eye tracking system comprising:

at least one camera positioned for capturing the image of any eye;

at least one illuminator for illuminating the eyes of a user;

a controller, communicatively coupled with the at least one camera, the controller is configured to:

receive and process data from said at least one camera to determine any errors in glint to illuminator matching and pupil position in a current image;

generate a blink signal indicating whether or not a blink has been detected in a current image based on a plurality of characteristics including a pupil-contrast-indicator that represents the contrast between the pupil and other features of the eye in the current image and a pupil-intensity-indicator that represents an intensity of pixels associated with the pupil;

receive a quality indicator that represents the quality of data in the current image; and set a validated blink signal to a validated blink value if the blink signal indicates that a blink has been detected and the quality indicator is less than a dynamically set validated blink threshold.

2. The eye tracking system of claim 1, wherein the quality indicator comprises a confidence value associated with an output of a pupil detection algorithm that is applied to the current image.

3. The eye tracking system of claim 1, wherein the controller is further configured to:

set a quality indicator baseline based on the quality indicator for one or more previous images; and set the validated blink threshold based on the quality indicator baseline.

4. The eye tracking system of claim 3, wherein the controller is further configured to:

set the quality indicator baseline based on the quality indicator for one or more previous images for which the blink signal indicates that a blink has not been detected.

5. The eye tracking system of claim 3, wherein the controller is further configured to set the quality indicator baseline based on the quality indicator for one or more previous images for which: (i) the blink signal indicates that a blink has been detected, and (ii) the quality indicator is higher than a baseline update threshold.

6. The eye tracking system of claim 3, wherein the controller is further configured to set the validated blink threshold as the higher of: (a) the quality indicator baseline minus a minimum required confidence drop; and (b) a minimum validated blink threshold level.

7. The eye tracking system of claim 3, wherein the controller is further configured to set the quality indicator baseline based on the quality indicators of a plurality of previous images.

8. The eye tracking system of claim 7, wherein the controller is further configured to set the quality indicator baseline based on a filtered combination of the quality indicators of the plurality of previous images.

9. The eye tracking system of claim 1, wherein the controller is further configured to:

determine if the blink signal indicates that a blink has been detected;

if the blink signal indicates that a blink has been detected, then determine if the quality indicator is less than the validated blink threshold; and if the quality indicator is less than the validated blink threshold, then set the validated blink signal to the validated blink value.

10. The eye tracking system of claim 1, wherein the controller is further configured to set the validated blink signal to a no-blink value if the blink signal indicates that a blink has not been detected.

11. The eye tracking system of claim 10, wherein the controller is further configured to set the validated blink signal to the no-blink value if the blink signal indicates that a blink has not been detected, irrespective of whether or not the quality indicator is greater than the validated blink threshold.

12. The eye tracking system of claim 1, wherein the eye tracking system further comprises a gaze tracker that is configured to apply a gaze tracking algorithm, wherein the gaze tracker is configured to:

for an image for which the associated validated blink signal does not have a validated blink value: the gaze tracker is further configured to apply the gaze tracking algorithm in order to provide an updated gaze signal for the image; and for an image for which the associated validated blink signal does have a validated-blink-value: the gaze tracker is further configured to provide a gaze-signal for the image based on the gaze-signal for one or more previous images.

13. The eye tracking system of claim 1, wherein the quality indicator comprises one or more of: (a) gaze quality parameter associated with a gaze signal that is provided as an output of a gaze tracking algorithm that is applied to the current image; (b) a pupil contrast indicator that represents a contrast between the pupil and other features of the eye in the current image; (c) a confidence value associated with a determined position of the cornea in the current image; (d) a gaze signal that is provided as an output of a gaze tracking algorithm that is applied to the current image, for comparison with one or more validated blink thresholds to determine if the gaze signal is out of bounds; or (e) a noise value that represents a measurement of noise level in an estimated pupil location, radius, cornea position, or gaze ray.

14. The eye tracking system of claim 1, wherein the eye tracking system is a component of a head mounted device.

15. A method of operating an eye tracking system, the method comprising:

illuminating the eyes of a user by means of at least one illuminator;

capturing, with at least one camera, an image of an eye;

receiving and processing data with a controller, communicatively coupled with the at least one camera to determine any errors in glint to illuminator matching and pupil position in a current image;

generating a blink signal indicating whether or not a blink has been detected in a current-image based on a plurality of characteristics including a pupil-contrast-indicator that represents the contrast between the pupil and other features of the eye in the current image and a pupil-intensity-indicator that represents an intensity of pixels associated with the pupil;

receiving a quality indicator that represents the quality of data in the current image; and setting a validated blink signal to a validated blink value if the blink signal indicates that a blink has been detected and the quality indicator is less than a dynamically set validated blink threshold.

16. The method of claim 15, wherein the quality indicator comprises a confidence value associated with an output of a pupil detection algorithm that is applied to the current image.

17. The method of claim 15, further comprising:

setting a quality indicator baseline based on the quality indicator for one or more previous images; and setting the validated blink threshold based on the quality indicator baseline.

18. The method of claim 17, further comprising setting the quality indicator baseline based on the quality indicator for one or more previous images for which the blink signal indicates that a blink has not been detected.

19. The method of claim 17, further comprising setting the quality indicator baseline based on the quality indicator for one or more previous images for which: (i) the blink signal indicates that a blink has been detected, and (ii) the quality indicator is higher than a baseline update threshold.

20. A non-transitory computer-readable storage media storing computer-executable instructions that, when executed by a processor, cause the processor to:

receive and process data from said at least one camera to determine any errors in glint to illuminator matching and pupil position in a current image;

generate a blink signal that represents whether or not a blink has been detected in a current image based on a plurality of characteristics including a pupil-contrast-indicator that represents the contrast between the pupil and other features of the eye in the current image and a pupil-intensity-indicator that represents an intensity of pixels associated with the pupil;

receive a quality indicator that represents the quality of data in the current image; and set a validated blink signal to a validated blink value if the blink signal indicates that a blink has been detected and the quality indicator is less than a dynamically set validated blink threshold.

* * * * *